United States Patent [19]
Irri

[11] Patent Number: 5,752,904
[45] Date of Patent: May 19, 1998

[54] AUTOMATIC TOOL CHANGE

[75] Inventor: Antero Irri, Lahti, Finland

[73] Assignee: Irri Oy, Espoo, Finland

[21] Appl. No.: 564,052

[22] PCT Filed: Jun. 23, 1994

[86] PCT No.: PCT/FI94/00286

§ 371 Date: Jun. 12, 1996

§ 102(e) Date: Jun. 12, 1996

[87] PCT Pub. No.: WO95/00298

PCT Pub. Date: Jan. 5, 1995

[30] Foreign Application Priority Data

Jun. 24, 1993 [FI] Finland ............... 932943

[51] Int. Cl.$^6$ .................................. B23Q 3/155
[52] U.S. Cl. ............... 483/13; 483/1; 483/30; 483/35; 409/232; 901/41
[58] Field of Search ............... 409/231, 232, 409/234; 483/1, 13, 30, 34, 35; 901/41, 29; 74/813 L

[56] References Cited

U.S. PATENT DOCUMENTS

| | | | |
|---|---|---|---|
| 2,348,292 | 5/1944 | Gross | 74/813 L |
| 2,873,822 | 2/1959 | Sloan | 74/813 L |
| 3,587,359 | 6/1971 | McCash | 483/35 |
| 3,691,899 | 9/1972 | Antonietto et al. | 409/232 |
| 3,739,660 | 6/1973 | Schubert | 74/813 L |
| 3,994,061 | 11/1976 | Tomita et al. | 409/234 |
| 4,091,526 | 5/1978 | Nakaso et al. | 74/813 L |
| 4,356,621 | 11/1982 | Tomita et al. | 483/7 |
| 4,484,854 | 11/1984 | Chitayat | 414/730 |
| 4,790,699 | 12/1988 | Ringel | 409/231 |
| 4,815,339 | 3/1989 | Bonadies et al. | 74/813 L |
| 4,934,504 | 6/1990 | Torii et al. | 74/813 L |
| 4,993,139 | 2/1991 | Burry et al. | 483/7 |
| 5,263,918 | 11/1993 | Ruetschle et al. | 483/34 |
| 5,435,577 | 7/1995 | Bauer et al. | 409/234 |
| 5,447,485 | 9/1995 | Bory et al. | 483/1 |

FOREIGN PATENT DOCUMENTS

| | | | |
|---|---|---|---|
| 140548 | 3/1980 | Germany | 483/35 |
| 32 08 621 C2 | 9/1983 | Germany . | |
| 62-193712 | 8/1987 | Japan | 483/34 |
| 1553280 | 2/1988 | U.S.S.R. | 409/231 |

*Primary Examiner*—A. L. Pitts
*Assistant Examiner*—Christopher Kirkman
*Attorney, Agent, or Firm*—Browdy and Neimark

[57] ABSTRACT

A method for automatically removing a tool from a rotational shank shaft of a three-dimensional robot by indexing the shank shaft, disposing a tool tightening member provided in connection with the indexed shank shaft to a releasing device by movement of the robot, the releasing device being disposed during this operation inside the movement range of the robot; using the releasing device to release the tool; and removing the tool from the shank shaft of the robot by a movement of the robot.

18 Claims, 3 Drawing Sheets

AUTOMATIC TOOL CHANGE

The present invention relates to a method for an automatic tool change and an apparatus carrying Out the method. More precisely, the present invention relates to a method and an apparatus used in connection with an automatic change of rotating tools of robots or similar devices.

It is prior known to use various rotating tools in machining operations performed by a robot, the operations being such as drilling, grinding or burring. The arm of said robot is provided with drive means, e.g. with a pneumatically or hydraulically operated motor, said drive means being provided with a tool secured to a rotatable axis or shaft of said motor. It has been known to use commercially available tool holding systems, e.g. quick-release taper shanks, which are prior known by the man skilled in the art for the clamping of said tool to said rotatable axis. However, in spite of the all-round operations of a robot, the tool change has been in general performed manually. This is due to several reasons, among others, since the robots generally in use are not able to carry and accurately move particularly heavy loads in the end of the arm thereof and therefore the rotating devices used are made as simple and light-weighted as possible. Thus the automatically operating tool holding and tightening devices used in normal machine tools, such as lathes, are too big in size, complicated and heavy to be used in the robot applications. Furthermore, said rotating tools require one further axis of movement, i.e. rotation, which cannot be provided to the end of a robot arm in the same manner as it is arranged in said machine tools, since the free three-dimensional movements of said robot prevent the providing of the rotating torque by similar mechanical means as those used, for example, in said lathes for providing the rotational movement. Adding one further axis of movement and a programmed indexing of an angular position of said axis to the control means of a robot is difficult and in use the programming work would be too difficult and time-consuming to be economically profitable.

DE-patent 3208621 discloses one solution for the automatic clamping of a tool. The apparatus comprises a clamping nut provided about the tool holder provided in the axis of said robot. Said tool, provided with a parallel shank is disposed through said nut and said nut is tightened by a cooperation of a special toothed rack which is driven by a work cylinder and a support means driven by a further work cylinder. A significant disadvantage of the arrangement disclosed in said publication is, however, that only tools with parallel shanks can be used, since the angular position (i.e. the rotational position) of the part of said robot receiving said tool is not known. This results in an insufficient ability of transferring the power required in modern machining appliances. Furthermore, only tools having equal shank diameters can be used in the arrangement disclosed in said DE-publication.

The use of an arrangement according to said DE-publication is also difficult because of the relatively big size of said tightening nut, which makes the working of the robot more difficult. Furthermore, the total equipment disclosed is very space consuming in the movement range of the robot. The arrangement is also very complicated and it comprises numerous parts which require very precise manufacturing and which parts are easily blocked-up by the chips generated during the machining process and the dirt present in work shops or similar environments. This easily results in the jamming of said parts. Furthermore, it has been found difficult to control the correct tightening force of said clamping nut of said tool by the device disclosed in said publication and comprising a pneumatic or hydraulic work cylinder. In many cases there is also a significant disadvantage in that the exact rotational position of the tool is not known when initiating the machining process or in that the angular position of said tool cannot be automatically indexed to a predetermined position.

Thus, the rotating tools used in robot appliances are mainly changed manually. This has resulted in a partial loss of the advantages which are the object of the machine automation. In other words, because of the frequent tool changes the robot requires an operator who manually changes said tools.

Therefore it is an object of the present invention to overcome said disadvantages of the prior art solutions and to provide a totally new solution for the automatic tool change of a robot or the like.

Furthermore, an object of the present invention is to provide an automatic tool changing system, in which said tool change utilizes the motions of said robot and in which system the change is performed in a quick, simple and reliable manner.

It is a further object of the present invention to provide a tool changing system in which the tool holder for the rotating tool can be any of the generally commercially available toolholders normally used in machining tools, such as lathes.

A further object of the present invention is to provide a tool changing system in which said tools can be stored in a simple tool rack, from which a single tool can be picked up by the robot and to which said tool can be replaced after use.

The invention is based on the idea that by adjusting an angular position of a rotatable axis i.e. by indexing said rotatable axis and a tightening member of a tool clamping means provided in said axis by specific indexing means to a predetermined position said tightening member can then be precisely disposed by a motion of said robot within the reach of a separately disposed tightening and/or releasing device, said suitably device(s) preferably being externally provided and capable of tightening and releasing said tightening member, e.g. a tightening screw.

More precisely, the method for an automatic tool change according to the present invention is mainly characterized by what is disclosed in appended claims 1 to 6 and especially by the characterizing portions of claims 1 and 2. The system for an automatic tool change according to the present invention is mainly characterized by what is disclosed in appended claims 7 to 15 and especially by the characterizing portion of claim 7.

According to a preferred embodiment of the present invention an end of a robot arm is provided with a drive device unit assembled in a suitable manner to said arm, said drive unit being adapted to provide at least some turning, reciprocating or rotating movement to the shaft relative to the center axis thereof, said shaft being provided with a tool receiving tool clamping device. Said drive means may be of any suitable type by which the appropriate motion, in most cases a rotational movement, of said shaft can be provided. Thus it may be a hydraulic, pneumatic or electric motor or a similar device, which is assembled in a suitable manner to said drive device unit. Furthermore, said drive device may preferably be rotatable in both directions and the speed and the torque of rotation can preferably be adjusted by suitable means. The tool clamping means or tool holder comprises a tool receiving portion, which includes clamping means for the tightening of the received tool firmly to its location in said toolholder.

Said clamping means comprise means inside said holder for providing a tight hold of said tool and a tightening member operated from the outside of said holder, said member being e.g. a tightening screw, a quick-release adapter or the like part of a hydraulic or pneumatic tightening system, said member providing the clamping moment or force by which said means disposed inside said holder lock said tool to its position. The preferred by screw operated or hydraulic or pneumatic toolholders are commercially available and, thus, the construction of these is not described in more detail in this connection.

The system according to the present invention further includes releasing and/or tightening means disposed within the movement range of said robot or the like apparatus capable of performing three-dimensional movements. Said releasing and/or tightening means are preferably movable such that they can be moved inside said movement range of said robot when the tool change is about to be initiated and then be moved outside said range after said tool change is completed. The releasing and/or tightening means may be, for example, a hydraulic, pneumatic or electric device or any another suitable device which can provide a motion, change of pressure or another function that releases and/or tightens said tightening member. In one preferred embodiment the torque of the rotational tightening movement is controllable during the releasing and/or tightening movement.

According to one embodiment of the present invention the releasing and/or tightening means is a solidly assembled and suitably formed tool or wrench by which the tightening member is released and tightened such that the clamping effect caused by said tightening member is affected by the movement of said robot's wrist or arm. This structure is preferred in cases in which said releasing and/or tightening movement of said tightening member is essentially short such that the movement of said robot arm is sufficient for totally releasing and tightening said tightening member. This kind of stationary tool is also preferred when the turning and rotating of the tightening members is performed by releasing and/or tightening means whose torque is not adjustable. In this case the releasing and tightening steps of the torque of said tightening member can be performed more carefully by the movement of said robot, thus avoiding breakage of the tool clamping devices in said toolholder, after which tightening members having quite a long range of movement can be rotated by similar non-adjustable means as mentioned above.

According to one preferred embodiment of the present invention a hydraulically or pneumatically operated tool holder structure is used. According to the present invention a tool clamping member is, after indexing of the rotating axis thereof, brought by a movement of a robot or the like to a releasing and/or tightening means, which is provided with a fast coupling suitable to cooperate with the fluid coupling of said tool clamping member. By decreasing/increasing the fluid pressure through said coupling, said tool can be released/locked to its position.

In a preferred embodiment according to the present invention said tightening member is brought into a predetermined position by indexing the shank axis by means of an indexing apparatus included in the tool changing system. Said apparatus preferably comprises means disposed in the periphery of said axis for receiving a protruding member disposed adjacent to said axis and arranged to be moved towards and away from said axis, by which means the rotational or turning movement of said axis can be stopped into a predetermined angular position. Furthermore, it is preferable to provide several stopping members closely adjacent to each other on said axis and to arrange said protruding member to be movable also in the axial direction of said axis, whereby more stop positions are provided.

According to one preferred embodiment of the present invention the stopping means on the periphery of the axis is formed by providing said axis with a discontinuous groove about the periphery thereof. The protruding member has a width that is less than the width of said groove and thus it can penetrate into said groove. The bottom of said groove is provided with at least one discontinuity, which is preferably such that the radius of the top of said discontinuity is greater than the radius of the bottom of said groove and not greater than equal to the radius of said axis.

According to an another preferred embodiment of the present invention a circular sleeve is arranged on the axis, said sleeve being provided with at least one bulge or stoppage forming the stopping member for said protruding member. By the use of such a sleeve a further machining of said shank axis is avoided.

According to a third embodiment of the present invention the indexing means is arranged by providing a pin-like protruding member and a hole, notch or slot provided on said axis, into which said protruding member penetrates towards the center of said axis with the assistance of a light biasing force provided, for example, by a spring or by pressurized air.

According to a further preferred embodiment the indexing means is provided by a structure in which an angularity sensor or pick-off detects the angular position of said axis. Said angularity sensor normally comprises means disposed on said axis for indicating the angular position and means disposed close to said axis for detecting said angular position. Such sensors are prior known and they may be, among others, optical, inductive or capacitive sensors or pick-offs. During the indexing, after detecting of said angular position said axis can be stopped and thereafter be held in the predetermined position in a number of different ways, for example by a mechanical brake which settles about the periphery of said axis and is operatively connected to said angularity sensor, or by an electrical field or the like operatively connected to said angularity sensor. An advantage of this kind of indexing is that the axis can be steplessly positioned in any possible angular position according to the output information of the angular position by said sensor.

According to a preferred embodiment of the method according to the present invention a tool releasing work cycle is initiated by indexing a shank axis, i.e. by bringing said axis precisely to a predetermined angular position. During the indexing said axis is rotated with a low torque by a drive means of said axis or an external device. For example, it is possible to utilize the movement of a robot and a suitable surface, for example a planar or curved surface, whereby the relative movement and the friction between said axis and said surface provides the rotation of said axis. After indexing, the toolholder means is moved by the movement of said robot to a releasing means disposed inside the movement range of said robot. A tightening member provided in said toolholder means is suitably fitted by said robot in said releasing means, whereafter the releasing operation of said releasing means is initiated and the clamping caused by said tightening member is loosened until said tool is released. After this the released tool still remaining in said holder is transferred by the movement of said robot to a tool rack. Said tool is prevented from dropping out from said holder since said toolholder is preferably swung by the wrist of said robot to such a position that said tool remains in the opening of said holder in consequence of gravity during the releasing operation and during the transfer to said tool rack. During the transfer the tool can also be held in other suitable arrangements, such as a light retaining force, which the tool rack is arranged to release.

According to a preferred embodiment the releasing of the clamping of said tool occurs in the tool rack, which can be provided with, for example, means which grip said tool and which after the releasing of said tool take said tool to its predetermined place in said rack, or alternatively with means which are arranged to release said clamping of said tool after said tool is placed by said robot in its predetermined place of storage.

According to one embodiment of the present invention the releasing of the tool is performed in two stages such that in the first stage the clamping torque is released by disposing the tightening member in a suitable fixed mounted tool and the tightening member is released by a movement of the robot's arm or wrist and in the second stage said tightening member, which is no longer under clamping torque but which still holds said tool is released by a suitable device, for example by a rotatable pneumatically operating means or other suitable means.

Consequently, according to a preferred embodiment of the method of the present invention the positioning of a tool includes the following steps: indexing of the axis as described above, retrieving said tool from a tool rack by a movement of said robot, bringing said tool in the toolholder and the tightening member into the reach of the tightening means, bringing said tightening means and tightening member into an operational relationship, clamping said tool by said tightening means and releasing the indexing apparatus.

The automatic tool chancing system according to the present invention is especially well suited to being used in machine automation appliances, in which rotating or turning tools are required and in which the tool holding system has to be light and simple, but also precise and reliable. Such systems, are for example various manipulators, chancing systems of rotating tools of machine tools and the like, in addition to the above described robot appliances.

In the following the present invention and the objects and advantages thereof will be described by way of an example with reference to the annexed drawings, in which similar reference characters throughout the various figures refer to similar features. It should be understood that the following description of an example of the invention is not meant to limit the invention to the specific forms presented in this connection but rather the present invention is meant to cover all modifications, similarities and alternatives which are included in the spirit and scope of the present invention, as defined by the appended claims.

FIGS. 5a, 5b, 5c, 5d and 5e disclose indexing means according to the present invention.

Figure 1:
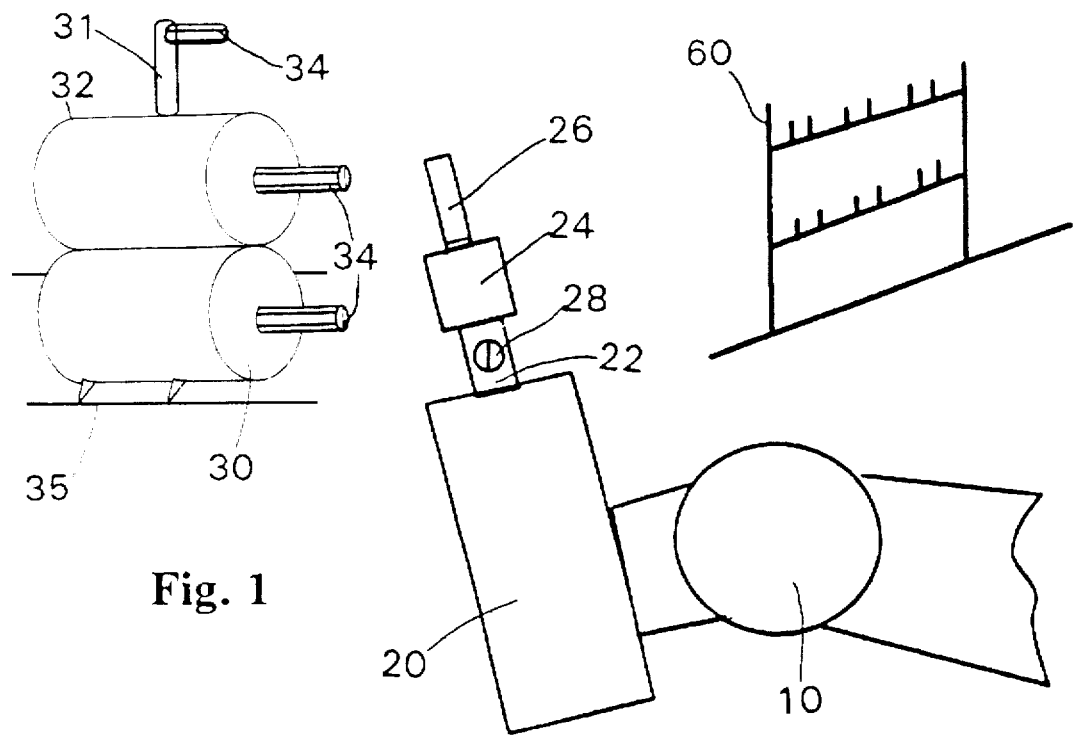
FIG. 1 is a schematic general view of a robot unit utilizing a tool changing system according to the present invention.

More particularly, a preferred embodiment of an automatic tool changing system is disclosed in the form of a principle presentation in FIG. 1. FIG. 1 discloses a robot arm 10, which is provided with a drive unit 20 at one end thereof. Said drive unit comprises a drive device which is arranged to rotate a shank axis 22. Said drive device is of a suitable type such as a pneumatic, hydraulic or electric motor. For the accommodation of a tool 26 a suitable toolholder 24 is assembled to said shank axis 22. A tool tightening member 28 is disposed in said shank axis, said member being in this connection shown as a screw. Inside the movement range of said robot are disposed a releasing device 30 and tightening device 32 of the tightening member 28 and a fixed releasing tool 31 connected to said releasing device. Devices 30 and 32 and said fixed tool 31 are provided with a tightening tool 34, which is adapted to be compatible with said tightening member. It should be noted that the releasing and tightening device of the tightening member may also be designed as one single device, which is capable of rotating in both directions of rotation, and that said devices in FIG. 1 are shown as separate ones for the purposes of clarity only. Said releasing and tightening devices 30, 32 are preferably arranged to be pneumatically, hydraulically or electrically driven. Said releasing and tightening devices are also preferably operationally connected to a control system of said robot or the like. Furthermore, said releasing and tightening devices are preferably arranged to be movable into said range of movement of said robot and away from said range of movement along guideways 35. FIG. 1 discloses also a rack 60 for said tools 26.

Figure 2:
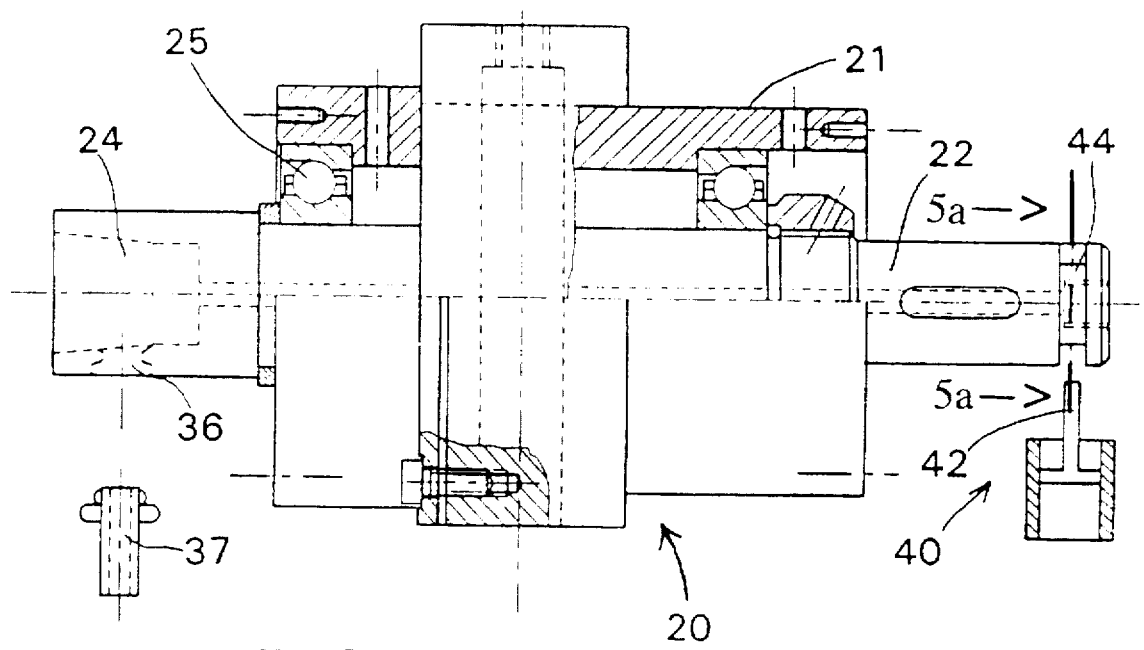
FIG. 2 is a view partially in section of a drive device unit disposed at the end of the robot arm.

FIG. 2 is a view partially in section of the drive unit 20, which has a joint surface 21 for the assembly to said robot or the like. A drive device (not shown) is arranged to rotate said axis 22, which is mounted with bearings 25 to the frame of said drive unit. Said tool clamping toolholder 24 is mounted at the other end of said axis. In the embodiment shown in FIG. 2 the clamping of said tool is arranged to be operated by hydraulic or pneumatic fluid and thus a quick-release adapter 36 provided in said axis 22 and a cooperating fluid connection counterpart 37 are also disclosed.

Said axis 22 is further provided with an indexing apparatus, generally designed at 40, which in the presented embodiment suitably comprises a protruding member 42 and a discontinuous groove 44 for receiving said protruding member.

Figure 3:
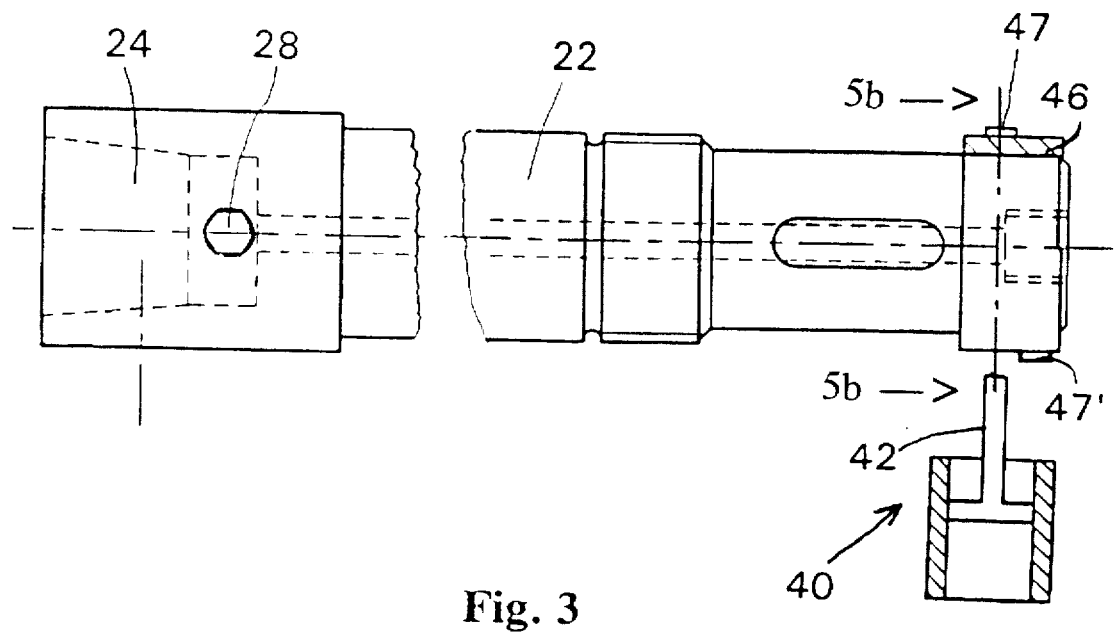
FIG. 3 is a more detailed view of a shank axis of the drive device unit and of one embodiment of an indexing apparatus.

FIG. 3 discloses in more detail one embodiment of said shank axis 22 and said tool clamping means 24 provided thereon as well as said indexing means 40. In this embodiment said indexing means 40 comprises a sleeve 46 mounted onto said axis, said sleeve being provided with shoulders 47 and 47' for receiving said protruding member. A preferred drive means for said protruding member 42 is also disclosed in this Figure, said means being arranged to move said protruding member towards said axis and away therefrom and said means being suitably operationally connected to a control system of a robot or the like.

Figure 4:
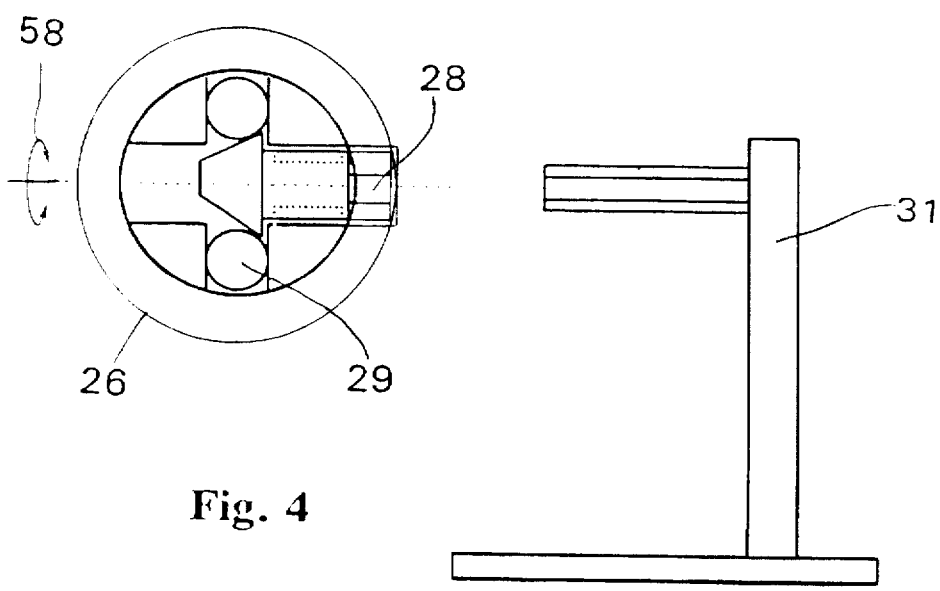
FIG. 4 is a presentation of one tightening system for the tool clamping and of one tool suitable for the tightening thereof.

FIG. 4 discloses, by way of an example only, a radial direction sectional view of an axis 22 of a prior known toolholder previously used only in connection with machine tool applications and a fixedly mounted tightening and releasing tool 31 according to the present invention. FIG. 4 indicates how, by rotating the tightening screw 28 with said tool in the way shown by a two-headed arrow 58 by a movement of robot's wrist, the clamping balls lock said tool 26 in its place in said holder, and correspondingly, by loosening said tightening screw said tool is released.

Figure 5A:
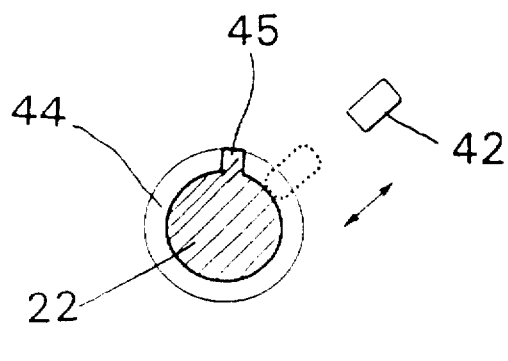

FIG. 5a is a sectional view of the axis along line A—A of FIG. 2 and shows one embodiment of the indexing apparatus 40. Around the periphery of said axis 22 is provided a discontinuous groove 44, said groove having a discontinuity 45. The Figure also shows a protruding member 42, which is arranged to move towards said axis 22 and away therefrom. When said robot or the like is working said protruding member is disposed in the farthest position thereof relative to said axis 22 and during the indexing operation it is moved into said discontinuous groove 44 of said axis, as shown by the broken line in FIG. 5a. Several adjacent grooves may be provided or one groove may include several discontinuities.

Figure 5B:
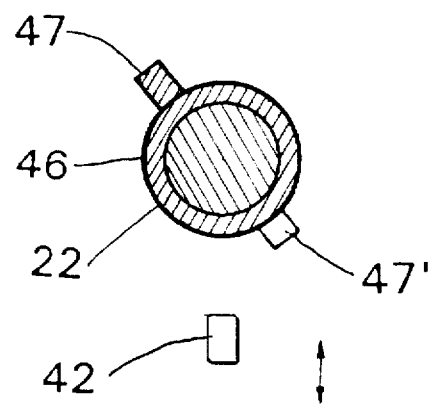

FIG. 5b is a sectional view of the axis along line B—B of FIG. 3 and shows another embodiment of the indexing apparatus. In this embodiment a sleeve 46 is mounted about the periphery of said axis 22, which sleeve is provided with the receiving shoulders 47, 4' for the protruding member.

Figure 5C:
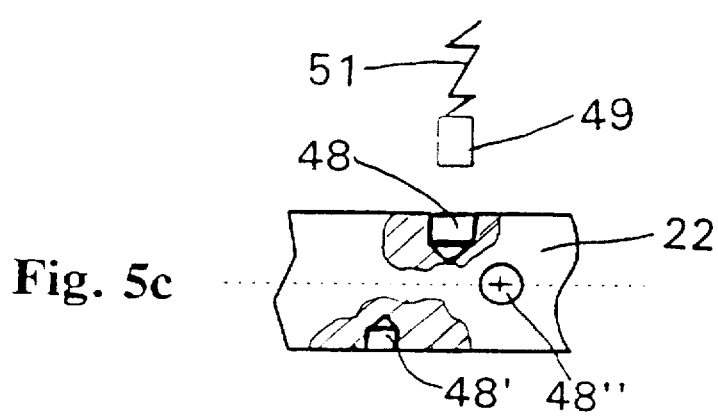

FIG. 5c discloses as a partially sectioned view a further embodiment of the indexing apparatus, in which the member on said axis for receiving an indexing pin 49 is formed by a bore 48 provided into said axis. Said indexing pin 49 is suitably shaped at the end facing said axis and is slightly biased by a spring 51. Alternatively, said biasing may be provided by, for example, a small pneumatic cylinder. FIG. 5c also discloses a second and third bore 48', 48", which are disposed on the periphery of said axis and spaced from each other in the longitudinal direction of said axis to allow several stop positions.

Figure 5D:
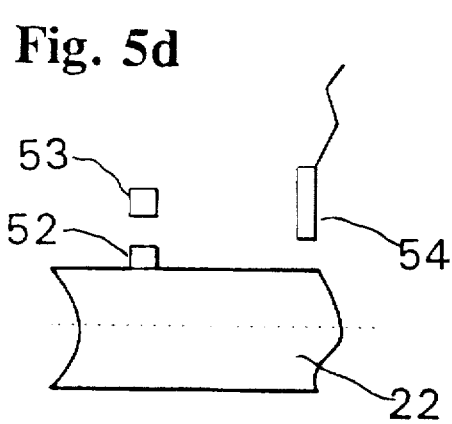

FIG. 5d discloses an angularity sensor or pick-off comprising an axis position indicator 52 mounted on said axis and a detector 53 operationally connected therewith. A suitable angularity sensor is preferably an optical, inductive or capacitive sensor. This Figure showing one embodiment of the indexing apparatus further discloses an electric magnet 54 operationally connected to said angularity sensor and arranged to stop said axis 22 in a predetermined angular position.

Figure 5E:
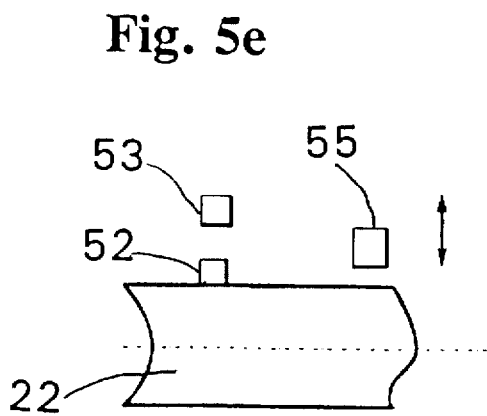

FIG. 5e is similar to that shown in FIG. 5d, but in this embodiment the electric brake is replaced by a mechanical friction brake 55.

When using the automatic tool changing device according to the present invention the tool change cycle is initiated when a drive unit 20 provided at one end of a robot arm 10 initiates the indexing step of a shank axis 22. Said shank axis of said drive unit 20 is rotated at a low speed by drive means of said axis or alternatively by suitable external means and an indexing apparatus 40 is activated. A protruding element 42 according to FIG. 5a, 5b or 5c moves towards said axis and causes in cooperation with a receiving member 45, 47 or 48 a stopping of the rotational movement of said axis. Said protruding member is held in its position close to said axis abutting said receiving member and due to the torque of said axis said axis is held in this position during the period of tool change.

The alternative indexing apparatus disclosed in FIGS. 5d and 5e operates such that an angularity sensor detects the angular position of the axis and a means operationally connected to said angularity sensor and providing an electromagnetic field or a mechanical brake or any other suitable means stops the rotation of said axis 22 in a predetermined angular position and holds said axis in this position during the toolchange process. In this alternative, the rotating torque of said axis may be removed immediately after the stopping means have performed said stopping.

Since the angular position of said axis stopped as described above is now known, said axis is indexed. Said indexed axis, comprising a clamping means tightening member, such as a screw, the position of which is thus now known, is then brought by a movement of an arm or wrist of said robot to a releasing means of said tool tightening member and said tightening member is fitted to a tool or wrench of said releasing means compatible with said tightening member or to any other suitable means for this purpose. After this, said releasing means is activated and it rotates or twists said tightening member open and thus releases said tool. In one alternative embodiment the internal fluid pressure of a tool holding means is changed whereby said tool is released. The position of said toolholder is preferably set such that said released tool cannot drop out. It is also possible to use various light holding or biasing means which prevent said tool from sliding out from said holder but from which the removing of said tool to a tool rack can be easily performed.

According to one preferred embodiment the clamping of said tool is released only after said tool is in said tool rack, which rack includes suitable means for releasing said tool and for transferring said tool to a predetermined position thereof or means for releasing said tool only after said tool is already brought into its final place of storage.

Alternatively, in some cases the clamping of said tool is partially released beforehand, i.e. the clamping force or torque is removed before the tightening member is placed into the device rotating said tightening member totally open. In this case said tightening member is brought into cooperation with a tool or wrench which is fixedly assembled and which fits to said tightening member and said clamping force is then opened, preferably by a movement of the robot arm or wrist. Then said opened tightening member still retaining said tool is brought to a rotatable releasing device and is rotated totally open.

The above described embodiment is preferable when using simple releasing devices, in which the torque cannot be adjusted. In such a case it is possible to choose a releasing and tightening device with has so low torque that it cannot break the clamping elements of the toolholder, but is capable, however, of rotating a loosened tightening member, such as a tightening screw. The loosening of said clamping force, which requires more power, may be performed by said robot having more easily controllable movements.

Furthermore, only a sole combination of a robot and a fixedly assembled opening tool is needed when the clamping system of the toolholder used is such that the releasing/tightening of a tightening member requires less than one full turn to be rotated for said releasing/tightening of said tightening member.

The released tool is preferably transferred by the robot to the tool rack and a new predetermined tool may be picked up at the same time. When the operation is initiated, for example in the morning after the equipments have been cut off, the tool adjustment operation is initiated with an indexing of the shank axis. In case the adjustment operation of a new tool follows immediately after the removal of the previously used tool, the indexing of said axis is still on and thus needs not to be repeated. The tightening member of the tool holding means for said picked tool is transferred by the movement of said robot to a tightening means, which may be said releasing means, but which is now rotated in a different direction. Said tightening member is clamped and said indexing is released, and said tool is ready for use.

Thus the present invention provides an apparatus and method, by which a tool change of a robot or the like can be per formed automatically. Said apparatus is simple in construction but reliable and precise in operation.

It should be noted that the foregoing examples of some embodiments of the present invention do not restrict the scope of protection defined in the appended claims. With the aid of the above description and the appended drawings it is clear to those skilled in the art to use, for example, a tool tightening member comprising at least one V-shaped means being fitted to cooperate with the toolholder or the axis to provide a clamping of the tool. It is also clear to those skilled in the art that the shank axis indexing apparatus may be placed in any position from which the above described effect of indexing the angular position of the axis can be provided.

I claim:

1. A method for automatically clamping a tool to a rotational shank shaft of a robot or similar apparatus performing three dimensional movements, the method comprising the steps of:

indexing said shank shaft of the robot or similar apparatus to an angular position;

accommodating said tool into a toolholder provided in said indexed shank shaft of the robot or similar apparatus;

disposing a tool tightening member provided in connection with said indexed shank shaft in a drive means of said tool tightening member by a movement of said robot or similar apparatus performing three dimensional movements, said drive means being disposed at least during said tool accommodating operation inside the movement range of said robot or similar apparatus; and tightening said tightening member by said drive means of said tool tightening member to a predetermined tightness for clamping of said tool into said toolholder provided in said indexed shank shaft of the robot or similar apparatus.

2. A method as set forth in claim 1, wherein said indexing of said shank shaft comprises:

moving an indexing means towards said shaft to a predetermined distance from said shaft; rotating said shank shaft with a low torque and such that said indexing means reaches a counterpart thereof provided in said shank shaft, whereby the rotation of said shank shaft stops and the angular position of said shank shaft is maintained by a cooperation of said indexing means and said counterpart thereof.

3. A method as set forth in claim 2, wherein the rotation of said shank shaft during the indexing is provided by:

moving a part of said shank shaft by a motion of said robot or similar apparatus into contact with a suitably disposed surface, and moving said shank shaft of the robot or similar apparatus along said surface in contact with said surface such that the friction between said part of said shank shaft and said surface causes the rotation of said shank shaft.

4. A method as set forth in claim 1, wherein said indexing of said shank shaft comprises:

rotating said shank shaft with a low torque; detecting the angular position of said shank shaft by an indicating means provided in said shaft and a detecting means cooperating with said indicating means and provided adjacent to said shank shaft; and stopping the rotation of said shaft in a predetermined angular position and holding said shaft in said predetermined position by a stopping and holding force caused by an electric field or a mechanical brake.

5. A method for automatically removing a tool from a rotational shank shaft of a robot or similar apparatus performing three dimensional movements, the method comprising the steps of:

indexing said shank shaft of the robot or similar apparatus to an angular position;

disposing a tool tightening member provided in connection with said indexed shank shaft to a releasing means of said tool tightening member by a movement of said robot or similar apparatus performing three dimensional movements, said releasing means being disposed at least during said tool removing operation inside the movement range of said robot or similar apparatus;

releasing said tightening member with the aid of said releasing means for releasing said tool; and removing said released tool from said shank shaft of the robot or similar apparatus by a movement of said robot or similar apparatus performing three dimensional movements.

6. A method for removing a tool as set forth in claim 5, wherein said releasing of said tool tightening member is performed in two stages in which:

a clamping force provided by said tightening member is removed by a movement of said robot or similar apparatus and a cooperating fixedly mounted opening device, whereafter said tightening member with no clamping force left is further opened by a rotatable releasing device such that a part of the tightening member still retaining said tool in its place is rotated or swung open by said releasing device.

7. A method as set forth in claim 5, wherein said indexing of said shank shaft comprises:

moving an indexing means towards said shaft to a predetermined distance from said shaft; rotating said shank shaft with a low torque and such that said indexing means reaches a counterpart thereof provided in said shank shaft, whereby the rotation of said shank shaft stops and the angular position of said shank shaft is maintained by a cooperation of said indexing means and said counterpart thereof.

8. A method as set forth in claim 7, wherein the rotation of said shank shaft during the indexing is provided by:

moving a part of said shank shaft by a motion of said robot or similar apparatus into contact with a suitably disposed surface, and moving said shank shaft of the robot or similar apparatus along said surface in contact with said surface such that the friction between said part of said shank shaft and said surface causes the rotation of said shank shaft.

9. A method as set forth in claim 5, wherein said indexing of said shank shaft comprises:

rotating said shank shaft with a low torque; detecting the angular position of said shank shaft by an indicating means provided in said shaft and a detecting means cooperating with said indicating means and provided adjacent to said shank shaft; and stopping the rotation of said shaft in a predetermined angular position and holding said shaft in said predetermined position by a stopping and holding force caused by an electric field or a mechanical brake.

10. An apparatus for an automatic tool change of a tool (26) disposed in a rotative shank shaft (22) of a robot or similar apparatus capable of performing three-dimensional movements, said apparatus comprising a tool holder (24) provided in said shank shaft for receiving said tool, a tightening member (28) for clamping said tool in said tool holder, tightening and/or releasing means (30.32) of said tightening member (28), characterized by said apparatus further comprising indexing means (40) for the indexing of the rotational position of said shaft (22) of the robot or similar apparatus, and in that said robot (10) or similar apparatus capable of performing three-dimensional movements is arranged to move said tightening member (28) of said tool (26) in the indexed shank shaft of the robot or similar apparatus to said tightening and/or releasing means (30,32), which means are placed inside a movement range of said robot (10) or similar apparatus at least during said tool change operation.

11. An apparatus as set forth in claim 10, wherein said means for releasing said tightening member (28) comprise a fixedly mounted means (31) arranged to cooperate with the movements of said robot (10) or similar apparatus for removing the clamping force provided by said tightening member (28), and a rotatable means (30) for further opening of the remaining non-clamping portion of said tightening member.

12. An apparatus as set forth in claim 10, wherein said tightening member is a screw (28), the rotation of which is arranged to provide a clamping hold on said tool (26).

13. An apparatus as set forth in claim 10, wherein said tightening member is a hydraulically or pneumatically operated member, which is arranged to provide a clamping hold from said tool (26) and which is arranged to be connected with a quick-release adapter (36) and a counterpart (37) thereof or in a similar manner to an external source of fluid so as to vary a fluid pressure inside said tightening member.

14. An apparatus as set forth in claim 10, wherein said indexing means (40) comprise a protruding means (42;49) movable at least in the radial direction of said shaft and disposed adjacent to said shaft and at least one groove, slot, boss or the like receiving means in connection with said shaft and arranged to receive said protruding means, whereby said protruding means and said at least one groove, slot, boss or the like are arranged cooperatively to stop said rotatable shaft (22) in one or more predetermined angular position(s).

15. An apparatus as set forth in claim 14, wherein said receiving means comprises at least one discontinuous groove (44) extending around said shaft (22), said groove including at least one discontinuity (45) arranged cooperatively with said protruding means (42) to stop the rotation of said shaft.

16. An apparatus as set forth in claim 14, wherein said receiving means comprises at least one sleeve (46) assembled non-rotatably to said shaft and having at least one boss or projection (47,47') being arranged cooperatively with said protruding means (42) to stop the rotation of said shaft.

17. An apparatus as set forth in claim 10, wherein said receiving means comprises at least one hole or boring or a slot (48) extending in the longitudinal direction of said shaft, said means being arranged cooperatively with said protruding means which is movable towards and away from said shaft and preferably comprises a pin (49) biased with a spring or pneumatic pressure, to stop the rotation of said shaft.

18. An apparatus as set forth in claim 10, wherein said indexing means comprise an indicator (52) disposed on said shaft (22) and a detector (53) connected cooperatively with said indicator for detecting the angular position of said shaft, and braking means (54,55) operationally connected with said detector (53) and indicator (52), said braking means being operated electrically, mechanically or by any other suitable means to stop and hold said shaft in a predetermined position.

\* \* \* \* \*